United States Patent
Stoehr et al.

(10) Patent No.: US 12,487,854 B2
(45) Date of Patent: Dec. 2, 2025

(54) MULTILAYER PROCESSING ENGINE IN A DATA ANALYTICS SYSTEM

(71) Applicant: The Boston Consulting Group, Inc., Boston, MA (US)

(72) Inventors: Maximilian Stoehr, Mississauga (CA); Niels Martin Freier, Paris (FR); Rajesh Yanamandra, Ashburn, VA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 584 days.

(21) Appl. No.: 17/845,851

(22) Filed: Jun. 21, 2022

(65) Prior Publication Data

US 2023/0052612 A1 Feb. 16, 2023

Related U.S. Application Data

(60) Provisional application No. 63/232,094, filed on Aug. 11, 2021.

(51) Int. Cl.
*G06F 9/455* (2018.01)
*G06F 9/50* (2006.01)
*G06F 16/2455* (2019.01)

(52) U.S. Cl.
CPC .......... *G06F 9/50* (2013.01); *G06F 16/24568* (2019.01)

(58) Field of Classification Search
CPC .............................. G06F 9/50; G06F 16/24568
USPC ........................................................ 718/104
See application file for complete search history.

(56) References Cited

U.S. PATENT DOCUMENTS

| | | |
|---|---|---|
| 9,430,858 B1 | 8/2016 | Har et al. |
| 10,783,450 B2 | 9/2020 | Vlassis et al. |
| 2016/0321308 A1 | 11/2016 | Brannand |
| 2017/0116295 A1* | 4/2017 | Wan ...................... G06F 16/254 |
| 2018/0173774 A1* | 6/2018 | Mcpherson ......... G06F 16/2393 |
| 2018/0182041 A1 | 6/2018 | Sheridan et al. |
| 2018/0301031 A1 | 10/2018 | Naamani et al. |
| 2020/0005523 A1 | 1/2020 | Brebner |
| 2020/0159438 A1 | 5/2020 | Meredith et al. |
| 2020/0210443 A1* | 7/2020 | Srinivasan .............. G06F 16/13 |

(Continued)

*Primary Examiner* — April Y Blair
*Assistant Examiner* — Justin Che-Chun Tong
(74) *Attorney, Agent, or Firm* — Fish & Richardson P.C.

(57) ABSTRACT

Methods, systems, and computer storage media for providing a multilayer processing engine of a multilayer processing system. The multilayer processing engine supports an event layer, a metadata layer, and a multi-tier processing layer. The metadata layer can refer to a functional layer that operates via a sequential hierarchy of functional layers (i.e., event layer and multi-tier processing layer) to analyze incoming event streams and configure a downstream processing configuration. The metadata layer provides for dynamic metadata-based configuration of downstream processing of data associated with the event layer and the multi-tier processing layer. The multilayer processing system can be a data analytics system—operating via a serverless distributed computing system. The data analytics system implements the multilayer processing engine as a serverless data analytics management engine for processing high frequency data at scale based on dynamically-generated processing code—generated based on a downstream processing configuration—that supports automatically processing the data.

16 Claims, 10 Drawing Sheets

(56) References Cited

U.S. PATENT DOCUMENTS

| | | |
|---|---|---|
| 2020/0285788 A1 | 9/2020 | Brebner |
| 2021/0142187 A1 | 5/2021 | Zilberman et al. |
| 2021/0182320 A1 | 6/2021 | Jin et al. |
| 2021/0200218 A1 | 7/2021 | Albrecht et al. |
| 2021/0216928 A1 | 7/2021 | O'Toole et al. |
| 2022/0222266 A1* | 7/2022 | Makumbi ............. G06F 16/258 |
| 2023/0049969 A1 | 2/2023 | Bolikowski et al. |

* cited by examiner

MULTILAYER PROCESSING ENGINE IN A DATA ANALYTICS SYSTEM

CROSS-REFERENCE SECTION

The present application claims the benefit of U.S. Provisional Application No. 63/232,094, filed Aug. 11, 2021 and entitled "MULTILAYER PROCESSING ENGINE IN A DATA ANALYTICS SYSTEM", the entirety of which is incorporated by reference herein.

BACKGROUND

Many companies rely on data analytics systems for computational analysis of data or statistics to discover, interpret, and communicate important patterns in data. Data analytics systems implement predictive analysis (e.g., a forecasting system) and machine learning that analyze current and historical facts to make predictions about future events. For example, business predictive models may identify historical and transactional data to identify risks and opportunities. Forecasting systems can also be used for projecting demands for goods and services offered. A data analytics system can further operate based on a cloud computing environment that provides on-demand availability of computer system resources, especially data storage, computing power, without direct active management. For example, a cloud computing analytics solution can use remote public or private computing resources to analyze data on-demand in order to streamline data analytics processes of gathering, integrating, analyzing, and presenting insights from data.

Conventionally, data analytics systems are not configured with a computing infrastructure and logic to dynamically provide and flexibly operate a data analytics system operating environment. In particular, conventional data analytics systems and corresponding operations (e.g., extract, transform, and load "ETL" processes) are configured to operate based on traditional cloud-based or server centric infrastructures. For example, data analytics system operations are designed for and operate based on dedicated resources, fixed bandwidth, and static servers. Moreover, conventional data analytics systems have not been updated to maximize the benefits of a serverless distributed computing system. As such, a more comprehensive data analytics systems—having an alternative basis for providing data analytics systems operations—can improve computing operations and interfaces in data analytics systems.

SUMMARY

Various aspects of the technology described herein are generally directed to systems, methods, and computer storage media, for among other things, providing a multilayer processing engine of a multilayer processing system. The multilayer processing engine supports an event layer, a metadata layer, and a multi-tier processing layer. The metadata layer can refer to a functional layer that operates via a sequential hierarchy of functional layers (i.e., event layer and multi-tier processing layer) to analyze incoming event streams and configure a downstream processing configuration. The metadata layer provides for dynamic metadata-based configuration of downstream processing of data associated with the event layer and the multi-tier processing layer. The multilayer processing system can be a data analytics system—operating via a serverless distributed computing system. The data analytics system implements the multilayer processing engine as a serverless data analytics management engine for processing high frequency data at scale based on dynamically-generated processing code—generated based on a downstream processing configuration—that supports automatically processing the data.

The multilayer processing engine can dynamically scale the infrastructure to changing workloads—as workloads increase or decrease—by provisioning computing components on an as-needed basis. The multilayer processing engine is implemented in a decoupled and cost-effective architecture. The multilayer processing engine also supports ETL processes that can be extended rapidly and do not require maintenance tasks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
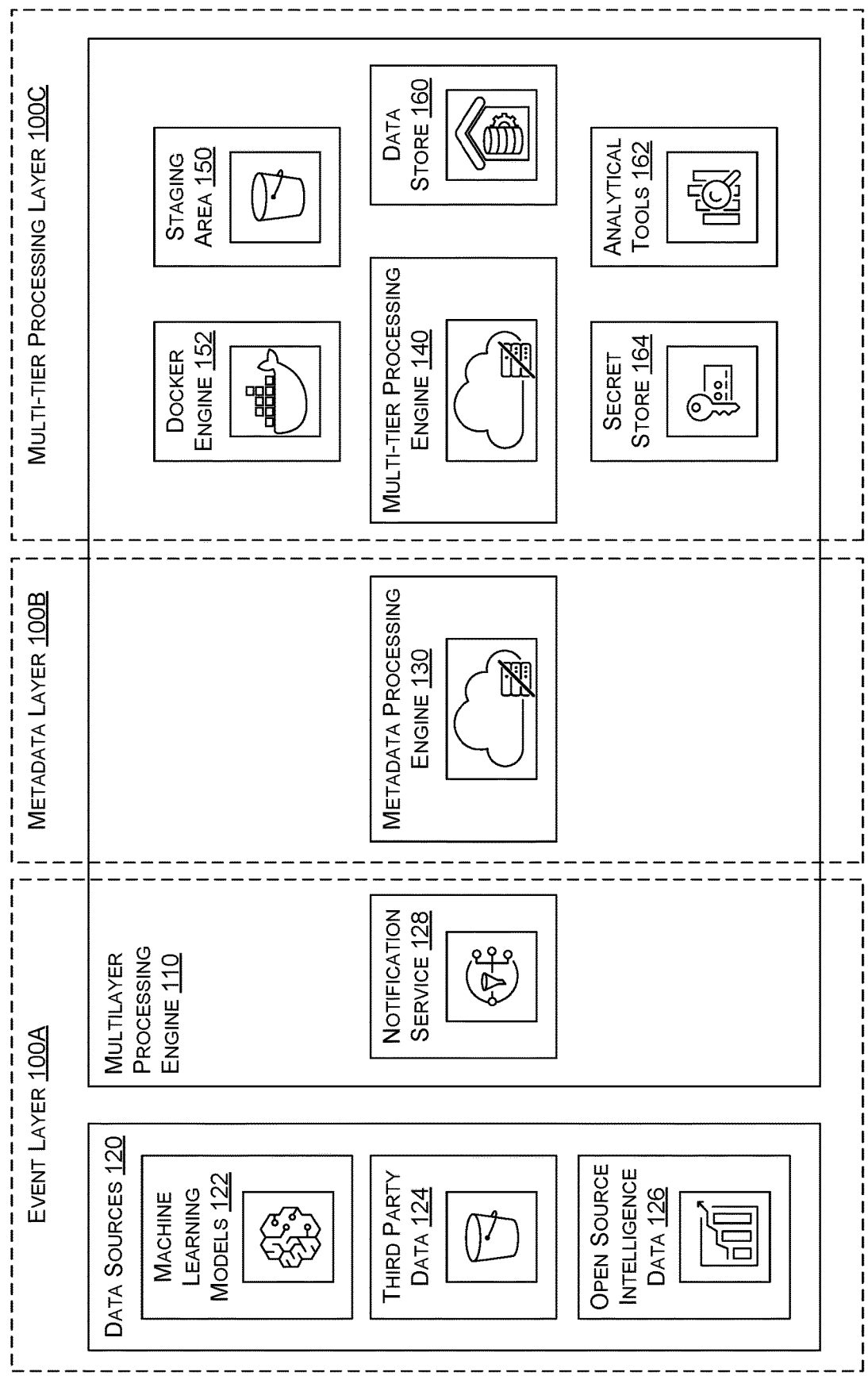
FIGS. 1A and 1B are block diagrams of an exemplary data analytics system with a multilayer processing engine, in which embodiments described herein may be employed.

By way of background, a data analytics system can support performing computational analysis of data or statistics to discover, interpret, and communicate important patterns in data. Many companies (e.g., retail, manufacturing, travel, construction) implement data analytics systems to gather, monitor, track, model, and deploy data-driven insights to create competitive advantages. A data analytics system can operate based on a cloud computing environment that provides on-demand availability of computer system resources, especially data storage, computing power, without direct active management. For example, a cloud computing analytics solution can use remote public or private computing resources to analyze data on-demand in order to streamline data analytics processes of gathering, integrating, analyzing, and presenting insights from data.

Conventional server-based architecture have several shortcomings that can be addressed using serverless implementations in a serverless distributed computing environment. For example, a server-based architecture can include tightly coupled application components, which can be slow to deploy and difficult to scale up. Serverless systems provide several advantages over conventional server-based systems. For example, automated scalability and management of capacity; reduced cost as only the time is billed that is actually used; high availability and fault tolerance is built in, and developers focus on rapid iterations as a cloud vendor manages aspects of the serverless system. Serverless systems are based on a serverless architecture implementation that includes application code that can be executed on-demand. A serverless architecture also includes close interaction between cloud services and functions.

Conventionally, data analytics systems are not configured with the computing infrastructure and logic to provide advanced techniques in dynamically provisioning and flexibly operating a data analytics system operating environment. In particular, conventional data analytics systems and corresponding operations (e.g., extract, transform, and load "ETL" processes) are configured to operate based on traditional cloud-based or server centric infrastructure. For example, ETL processes operate using large and expensive computing systems. As such, ETL processes can be inflexible and maintenance heavy using computing systems that are resource intensive.

Moreover, conventional data analytics system operations were designed to operate on traditional cloud-based or server centric infrastructure and have not been updated to maximize the benefits of a serverless distributed computing system. For example, ETL processes do not allow rapid iterations in processing data and can be a bottleneck and slow down data processing. As such, data analytics processes are faced with the challenge of building and maintaining a scalable and resilient data platform for providing data-driven insights, which can be complicated and expensive.

Traditional static infrastructures—in contrast to a serverless distributed computing system—include computing components that are pre-configured without flexibility or elasticity to operate on data analytics system workloads via ETL processing. For example, ETL processes for data are often hard-coded having a one-to-one mapping of data source to data processing step, which would require a permanently running infrastructure. As such, traditional ETL processes and server centric infrastructures are not able to handle large scale and high frequency data ingestions.

Moreover, ETL processes are not configured for analyzing stream data because of their hard-coded construct and static infrastructure. ETL processes designed in this manner can further be expensive because the ETL processes need continued maintenance of the code by developers and monitoring of the ETL processing. By way of example, new data from a vendor being processed—via the ETL processes—would first have to be analyzed to identify attributes of the data (e.g., data structure, source, column names, data types, etc.) as part of the ETL process prior to processing the data. And changes to a data source would need updates to the code. Moreover, monitoring of ETL processes would also have to be hard-coded to keep track of flow of data. As such, a more comprehensive data analytics systems—having an alternative basis for providing data analytics systems operations—can improve computing operations and interfaces in data analytics systems.

Embodiments of the present disclosure are directed to providing a multilayer processing engine of a multilayer processing system. The multilayer processing engine supports an event layer, a metadata layer, and a multi-tier processing layer. The metadata layer can refer to a functional layer that operates via a sequential hierarchy of functional layers (i.e., event layer and multi-tier processing layer) to analyze incoming event streams and configure a downstream processing configuration. The metadata layer provides for dynamic metadata-based configuration of downstream processing of data associated with the event layer and the multi-tier processing layer. The multilayer processing system can be a data analytics system—operating via a serverless distributed computing system. The data analytics system implements the multilayer processing engine as a serverless data analytics management engine for processing high frequency data at scale based on dynamically-generated processing code—generated based on a downstream processing configuration—that supports automatically processing the data.

The multilayer processing engine can dynamically scale the infrastructure to changing workloads—as workloads increase or decrease—by provisioning computing components on an as-needed basis. The multilayer processing engine is implemented in a decoupled and cost-effective architecture. The multilayer processing engine also supports ETL processes that can be extended rapidly and do not require maintenance tasks.

At a high level, the multilayer processing engine implements a combination of event layer, metadata layer, and multi-tier processing layer to automatically analyze the underlying data sources and then generate the code which is needed to process the data automatically. The multilayer processing engine includes components and processing steps that are provisioned on-demand and after processing the components can be decommissioned based on automatically generated code. The multilayer processing engine provides monitoring functionality, the monitoring functionality operates with a data warehouse and analytical tools to monitor streams of data in a centralized manner.

The multilayer processing engine accesses data sources that provide event streams. The event layer supports accessing the data sources. In particular, the event layer can generate data-driven events (e.g., event streams or data streams) that are associated with data from the plurality of data sources. The event layer (e.g., via a notification service) can communicate the data-driven events to the metadata layer. The event layer accesses event streams that have data associated with metadata attributes that can be extracted. The event streams are associated with different data sources. For example, a time event; or a machine learning model that can trigger a message via a message service, such that, data from the machine learning model is retrieved (e.g., HTTP call with the ML data). Event streams can be associated with one or more data sources that communicate data to the multilayer processing engine.

The multilayer processing engine (e.g., via the metadata layer and metadata processing engine) analyzes the data structure of the data in event streams to identify metadata attributes. The multilayer processing engine analyzes the data to infer and approximate data types and column names—to automatically map the data to targeted storage locations in a data store. The targeted storage locations are associated with metadata attributes such that the data from the event streams are appropriately mapped.

The multilayer processing engine is built on an architecture that dynamically changes based on the workload. In the multi-tier processing layer, a target container can take a dynamic configuration (i.e., downstream processing configuration) that is passed from the metadata layer into the target container. Based on the dynamic configuration that includes metadata attributes and processing steps associated with the metadata attributes, the multi-tier processing layer performs the processing steps. For example, metadata attributes are used to map data to targeted database locations corresponding to the metadata attributes.

The metadata layer is associated with code that supports accessing event streams associated with data sources processed via the event layer. The metadata layer accesses data including metadata information—associated with the various data sources—and processes them based on the data source (i.e., the type of data source). For example, a time-based source can be associated with a name of a time-based data source rule and the source of the data (e.g., data vendor). The metadata information can be used to derive additional metadata information. The data structure of the data can support determining a loading frequency (e.g., time-based data can indicate a frequency at which the data is available).

Data associated with a machine learning model (i.e., machine learning model processing data) can be retrieved via the notification service or HTTP call. The machine learning model processing data can be detailed including a frequency with which the machine learning model runs (e.g., daily, weekly, monthly) time granularity, location, name. The metadata layer associates (e.g., enriches, appends, or augments) the data with default configurations. For example, for 1000 files, one gigabyte, the processing step can allocate an amount of memory, CPU calls, and other compute and storage resources.

The metadata layer may also identify the standards and data processing steps to be executed on the data. Different file formats or types can be associated with different standards. For example, .XLS file, parquet format, machine learning model data each have corresponding formats. The processing steps are also based on file formats or types. The metadata layer can generate metadata layer output including the above-referenced information that is communicated to the multi-tier processing layer.

The multi-tier processing layer uses the metadata layer output to dynamically provision compute resources. The multi-tier processing layer also supports copying, monitoring and checking the integrity of the data. The data can be copied to a staging area. With the data in the staging area, the multi-tier processing layer supports dynamically generating code (e.g., SQL code) associated with a storage database. The data is retrieved from the staging area—based at least in part on the code—and stored in a targeted storage location based on the metadata attributes. Storing the data in the targeted storage location can include transforming (e.g., predefined transformations or customized transformations) the data to be stored in the targeted storage location.

The multi-tier processing layer further communicates the data into a machine learning model that perform analysis on the data from the storage location. The multi-tier processing layer supports centralized monitoring to monitor the data flow from the start to the end and provide notifications (e.g., corrupted data, whether data needs to be decrypted) and status data of resources. Monitoring can include an admin interface that visualizes on-going processing. For example, failures or certain types of data that have not been transformed.

Advantageously, instead of hardcoded transformations, the multilayer processing system can infer transformations or perform default transformations. Making transformations can be done without writing the underlying code but by passing keywords in the metadata layer output. For example, automatic compression of files can be executed to make the file size smaller and therefore the processing a bit faster, or merging data combined into different types of data sources can be performed dynamically. Other data warehouse transformations include a date table or calendar table or rolling up or scroll up aggregations by dates, or by region, for example, by US state or County.

Figure 1B:
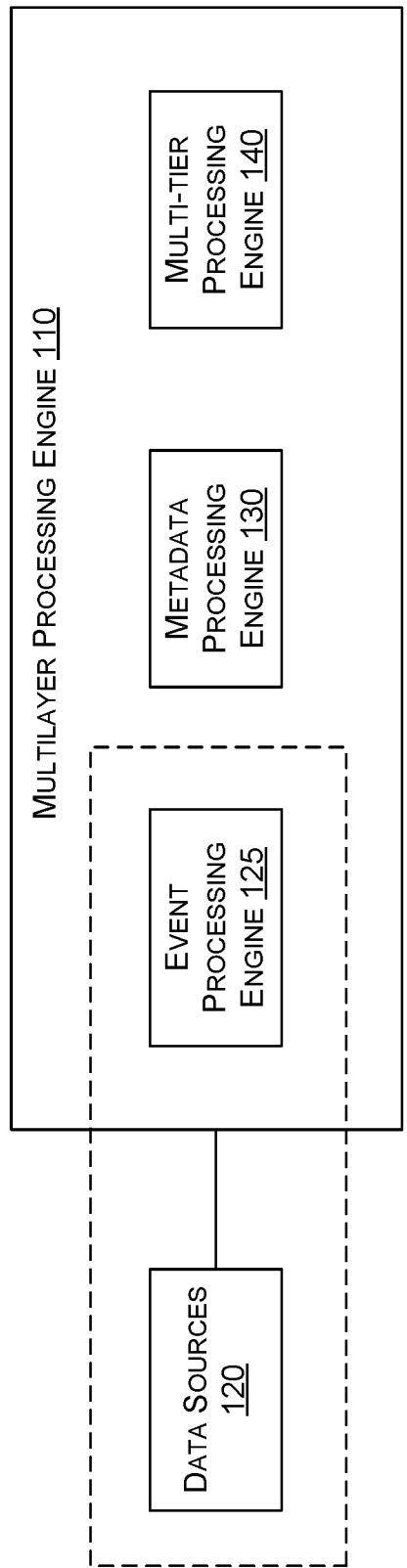
Figure 1C:
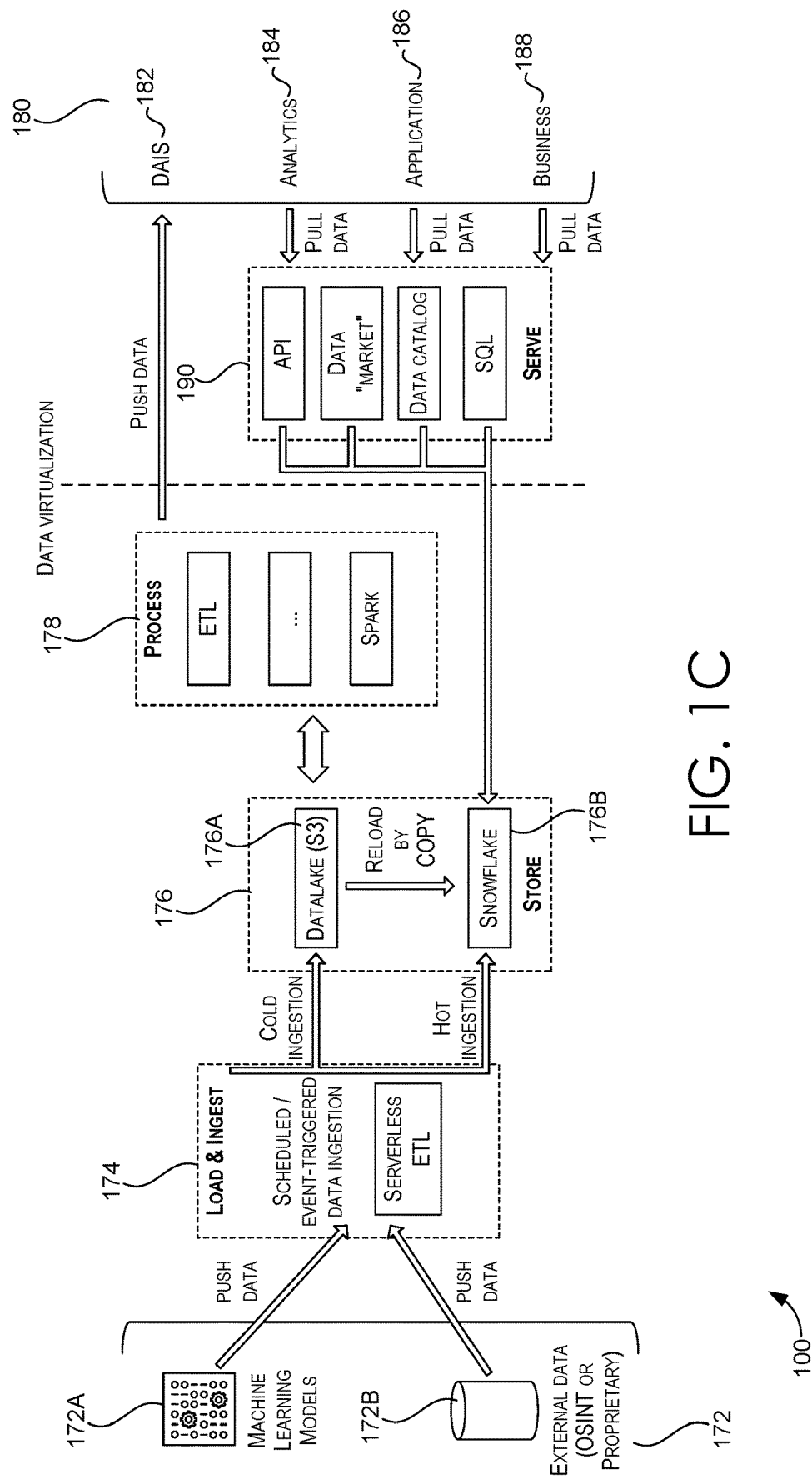
FIG. 1C is an exemplary schematic associated with a data analytics system with a multilayer processing engine, in which embodiments described herein may be employed.

Aspects of the technical solution can be described by way of examples and with reference to FIGS. 1A, 1B, and 1C. FIG. 1A illustrates a data analytics system 100—also referred to herein as the multilayer processing system 100—including an event layer 100A, metadata layer 100B, multi-tier processing layer 100C, and multilayer processing engine 110 (i.e., data analytics engine or serverless management engine). The event layer 100A includes data sources 120 including machine learning models 122, third party data 124, open source intelligence data 126, and notification service 128. The metadata layer 100B includes the metadata processing engine 130, and the multi-tier processing layer 100C includes multi-tier processing engine 140, staging area 150, docker engine 152, data store 160, analytical tools 162, and secret store 164.

The multilayer processing system 100 operates based on a serverless architecture. The serverless architecture is decoupled in that the serverless architecture allows each computing component to exist and perform tasks independently of one another, allowing the components to remain completely unaware and autonomous until instructed. Decoupled architecture allows for easier maintenance of code and change implementations; multiple cross-platforms, languages and technologies; independent releases; streamlined and faster development; and improved testability of computing components.

The multilayer processing system 100 can be implemented as a high-frequency data and modeling platform that drives real-time insights. The multilayer processing engine 110 can support scalability, semi-structured data, internal and external connectability, a data sharing model. The multilayer processing system 100 supports metadata-based configuration and dynamic provisioning of resources provided via the multilayer processing engine 110 as described herein. As such, the multilayer processing engine 110 addresses the limitations in conventional ETL processes by obviating the need for ETL processes that are hard-coded.

With reference to FIG. 1B, FIG. 1B illustrates aspects of the multilayer processing engine 110. FIG. 1B includes data sources 120, event processing engine 125, metadata processing engine 130, and multi-tier processing engine 140. In particular, the event layer 100A, the metadata layer 100B, and multi-tier processing layer 100C and corresponding engines—event processing engine 125, metadata processing engine 130, and multi-tier processing engine 140—can be used to automatically analyze underlying data sources and dynamically generate the code which is needed to process the data from the data sources. In this way, the multilayer processing system 100 removes the need for a permanently running infrastructure because the multilayer processing engine 110 operates based on performing operations and provisioning resources on-demand and after the processing is done, the provisioned resources can be decommissioned.

As shown in FIGS. 1A and 1B, the multilayer processing engine 110 includes an event layer 100A. The event layer is connected to data sources 120 that include outputs from machine learning models (e.g., machine learning models 122), third party data sources (e.g., third party data 124) and open source data (e.g., open source intelligence data 126). Data sources 120 can be associated with events. The different events associated with data sources 120 are mapped to targeted storage locations. Machine learning models 122 can also trigger a notification message, such that, data associated with the machine learning model is embedded in the body of the notification. For example, a message can be an HTTP call that is then embedded with machine learning model data.

The event layer 100A supports triggering communication of event data to metadata layer 100B. For example, the notification service 128 can support generating notifications and messages associated with data, data streams, or stream events of the data sources 120. In this way, the event layer 100A can generate data-driven events. The event layer 100A provides the data-driven events to the metadata layer 100B that operates to intelligently analyze the stream of data.

The metadata layer 100B operates as a connector between the event layer 100A and the multi-tier processing layer 100C. The metadata layer I00B takes input from the event layer 100A and uses the metadata processing engine 130 and other built-in computing resources to perform predefined functions upon detection of specific input for processing and communicating data. The metadata layer 100B may receive the different inputs (e.g., time-based data source or machine learning model data source). The metadata layer 100B can access a corresponding rule based on the input type (e.g., a time-based rule is associated with a time-based data source). The metadata layer 100B can also access additional information about the input (e.g., source location of the data, destination of the data). In the scenario where a notification message is received from a machine learning model, the metadata layer 100B can embed information from the machine learning model (e.g., embed information into an HTTP call). The metadata layer 100B accesses events from the data sources 120 or event streams and modifies the data with default configurations. For example, if a data source provides an input of a given size (e.g., 1000 files with size 1 GB) then the metadata layer provisions a processing step that allows for processing the input based on the attributes of the input. The metadata layer 100B can be configured to derive additional data including timing on when to load the data, which could be based on the structure of the data itself.

The metadata layer 100B enriches pre-defined set of configuration data. For example, the data can be analyzed to identify data types, column names, metadata attributes that are used to a generate downstream processing configuration for processing the data. In particular, the metadata layer 100B is configured to dynamically configure downstream processing and trigger provisioning appropriate cloud resources on-demand. Dynamically configuration includes: dynamically provisioning processing steps, analyzing incoming event streams, automatic identification of data attributes based on metadata and mapping the data to target storage location for automatic processing. For example, for a new data set, the data can be analyzed to identify data attributes to map the data attributes to predefined target storage locations using mapping rules for mapping data to target storage location. In this way, new data can be extracted and placed in targeted storage locations without manual interactions.

The metadata layer 100B is associated with a metadata processing engine 130. The metadata processing engine 130 includes code that triggers performing operations whenever an event is received from the event layer 100A. For example, the metadata layer 100B can be implemented as part of a serverless compute service that supports running code without provisioning or manager servers, create workload-aware cluster scaling logic, maintaining event integrations, or managing runtimes. The metadata layer 100B generates a downstream processing configuration that supports augmenting or transforming the data based on the type of data that is provided in the input. The downstream processing configuration further includes provisioning operations that can include provisioning attributes (e.g., a number of CPU calls, and amount of memory) needed for data of an event stream. A default configuration can also identify a set operational standards based on the data type in the data stream. For example, the set of operational standards can include instructions on how to process the particular data type including operational standards for files and file formats (e.g., excel files, machine learning models, and packet formats). The metadata layer can communicate the metadata layer output to the multi-tier processing layer.

The multi-tier processing layer 100C includes several data analytics system features, including: a staging area 150 (e.g., cloud computing staging area for assembling, testing, and reviewing a new solution before it is moved to production and the existing solution decommissioned); docker engine 152 (e.g., a docker platform for Operating System (OS) level virtualization that delivers software in packages called containers); a data store 160 (e.g., a data store with targeted storage location for storing data from the data sources 120); analytical tools 162 (e.g., tools that run mathematical processes on large sets of data for statistical, qualitative, or predictive analysis); and secret store 164 (e.g., store for privileged credentials and private information that act as keys to unlock protected resources or sensitive information).

The multi-tier processing layer 100C performs operations including: executing pre-processing steps; assessing the quality of data; loading the data to an intermediate staging area. Processes data using large-scale data warehouse. Advantageously, on-demand resources ensure cost effective processing. Dynamic metadata configuration allows for rapid iterations and changes. Operationally, the downstream provisioning configuration comprising metadata attributes and provisioning instructions is used to trigger provisioning operations on the multi-tier processing layer 100C. The metadata of the input data include attributes associated with instructions that instruct the multi-tier processing engine 140 on the set of operations that should be performed and provisioning of resources to process the input data. Upon completion of the data based on the downstream processing configuration, data in the data stream can be stored in target storage locations (e.g., tables).

The multi-tier processing layer 100C is configured to dynamically provision computing resources and execute steps. The multi-tier processing layer 100C is further responsible for monitoring the data to determine the data error messages—is not corrupted. The multi-tier processing layer output is then communicated to a staging area that supports dynamically producing code (e.g., SQL code) such that a database can access the data from a staging area. The data can be transformed and stored in targeted storage locations based on the code and metadata information associated with the data. Transforming data can be based on a plurality of files that need to be combined or processed together to perform a targeted transformation. Data transformation is performed automatically without manual intervention, infer default transformations. For example, looking at a data set a determination can be made that the data set should aggregated by day, week, or month and stored in a corresponding targeted storage location in the database.

The multi-tier processing layer 100C supports encoding a file in a specific file format (e.g., apache parquet files). Different storage formats can be identified as compatible to corresponding data processing frameworks. For example, a demand forecasting data analytics system can be associated with a particular storage formats for data analytics tools associated with demand forecasting. The multi-tier processing layer 100C further supports efficiently merging data and combining different types of data sources. The multi-tier processing layer 100C can use a variety of techniques including: using a data table, a calendar table, rolling up or scroll up aggregation by date or by region. The data stored in the database can be communicated back into the machine learning models and other types of data analytics tools that access the data for additional processing.

The multi-tier processing layer 100C supports centralized monitoring system that monitors the data flow from the event streams to the database. The centralized monitoring system can provide notifications if there is corrupted data or unknown data type that cannot be processed. If data is encrypted and there exists no ability to unencrypt the data, a notification can be generated. The multilayer processing engine 110 monitors the automatic processing features associated with the automatic code generation. The multilayer processing engine 110 can also constantly monitor the stream of data being processed in a centralized manner. Monitoring service can receive a start event and identification of metadata (e.g., name, vendor, data type, etc.) associated with the event.

With reference to FIG. 1C, FIG. 1C illustrates aspects of the multilayer processing system 100. FIG. 1C includes data sources 172 (including machine learning model 172A and external data sources 172B (e.g., OSINT and proprietary data sources); load and ingest (engine) 174, store (engine) 176 (including data warehouse (e.g., DATALAKE) 176A and data warehouse (e.g., SNOWFLAKE) 176B), process (engine) 178, tools 180 (including distributed artificial intelligent systems (DAIS) 182, analytics 184, application 186 and business 188, and serve (engine) 190 (e.g., APIs, data market, data catalog, and SQL).

At a high level, operationally, the data sources can push data (or data can be pulled) into a load and ingest engine 174. The load and ingest engine 174 can implement a serverless ETL and support scheduled or event-triggered data ingestion. The load and digest engine 174 provides for scheduled or event-triggered data ingestions. The load and digest engine 174 can further support cold ingestion and hot ingestion corresponding to cold storage (e.g., data warehouse) and hot storage. The data sources 172 and the load and digest engine 174 correspond to the event layer 100A and the metadata layer 100B. The store engine 176 and the process engine 178—that perform ETL operations for the tools 180—correspond to the multi-tier layer 100C and support pushing data—to the tools 180—and pulling data back to the store engine 176.

In operation, the cold ingestion data is communicated into data warehouse 176A (i.e., repository of data stored in its natural/raw format, usually object blobs or files). The data warehouse can be data lake store of data including raw copies of source system data, sensor data, social data, etc. and transformed data used for tasks such as reporting, visualization, advanced analytics and machine learning. The hot ingestion data is communicated into data warehouse 176B (i.e., cloud-based data storage and analytics service).

The process engine 178 can support communications between tools 180 (including distributed artificial intelligent systems (DAIS) 182, analytics 184, application 186 and business 188, and serve (engine) 190 (e.g., APIs, data market, data catalog, and SQL) and the store 176. The process engine can provide ETL operations and web interfaces for accessing store 176. The serve engine 190 can be configured to communicate directly with the store 176 to retrieve pulled data from the tools 180.

Figure 2A:
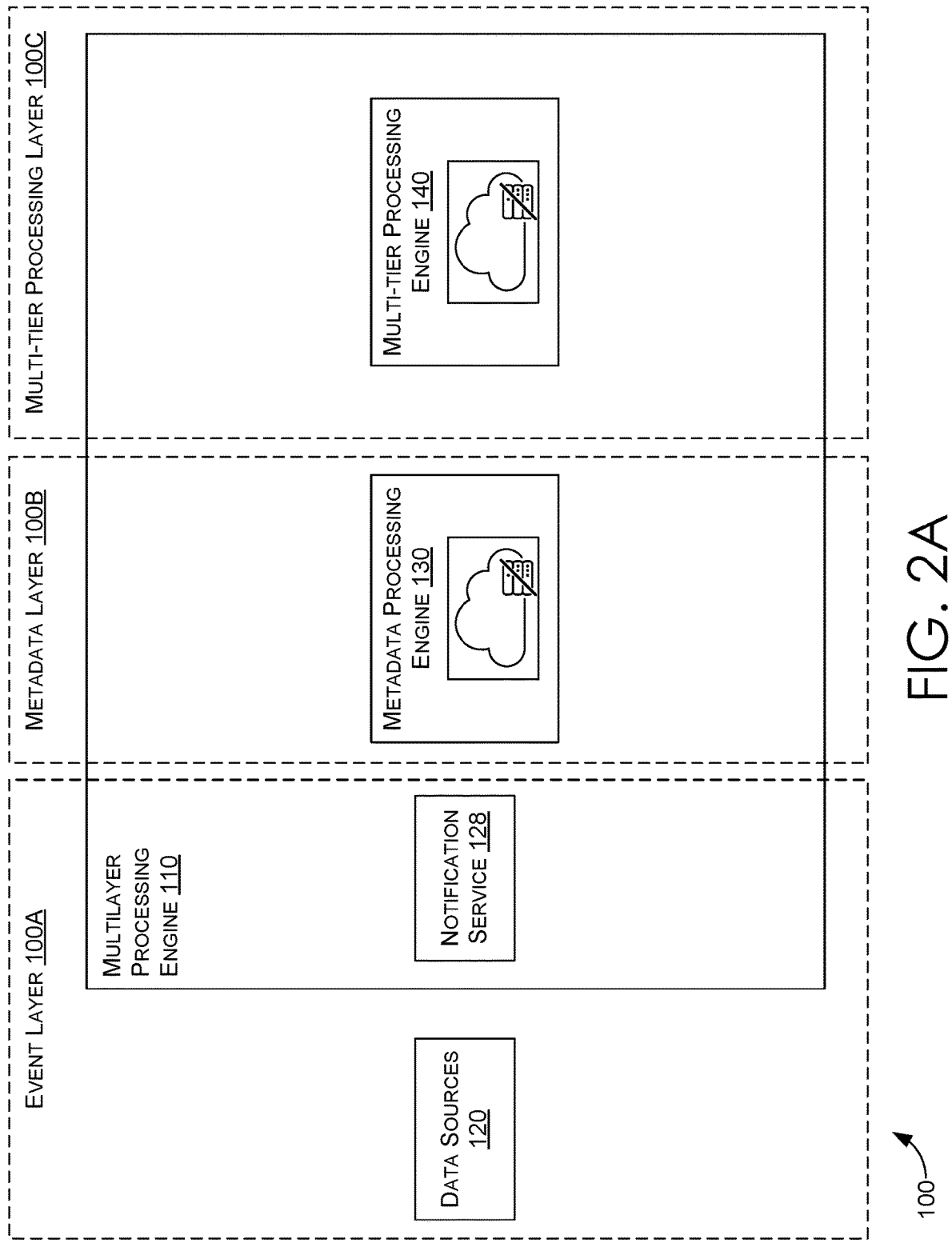
FIGS. 2A and 2B are block diagrams of an exemplary data analytics system with a multilayer processing engine, in which embodiments described herein may be employed.
Figure 2B:
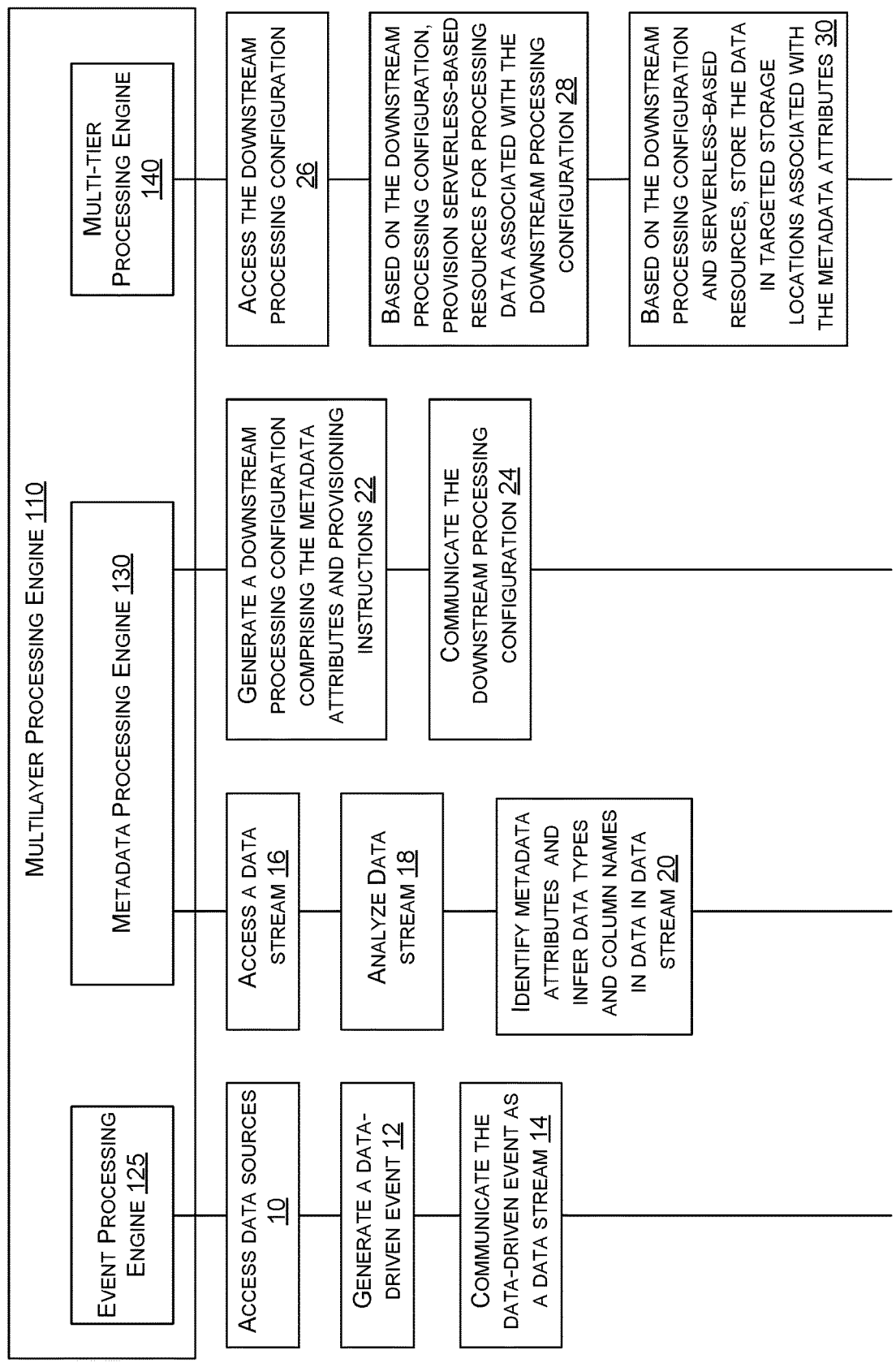

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example data analytics system 100 in which methods of the present disclosure may be employed. In particular, FIG. 2A shows a high level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including event layer 100A, metadata layer 100B, multi-tier processing layer 100C. The event layer 100A including data sources 120, notification server 128, metadata layer 100B including metadata processing engine 130, and the multi-tier processing layer 100C including the multi-tier processing engine 140.

The event layer 100A, the metadata layer 100B, and the multi-tier processing layer 100C are provided in a sequential hierarchy to support analyzing data streams—associated with a plurality of data sources (e.g., data sources 120) based on dynamic metadata-based configuration of downstream processing of data streams. The event layer 100A (event processing engine 125 shown in FIG. 1B) is associated with data sources 120 that are processed based on the type of data source. The event layer 100A further provides a notification server 128 associated with providing notification for accessing data streams (e.g., a machine learning model data stream or time-based data stream) associated with the notification server 128.

The metadata processing engine 130 of the metadata layer processes the data streams of the event layer. The metadata processing engine 130 is configured to generate the downstream processing configuration based on: identifying metadata attributes of the data based on analyzing data structures of data; inferring data types and column names; and generating the downstream processing configuration comprising instructions for mapping the data to targeted storage locations based on the inferred data types, column names, and metadata attributes. The metadata processing engine 130 communicates the downstream processing configuration to the multi-tier processing layer 100C and the multi-tier processing engine 140.

The multi-tier processing layer 100C is associated with dynamically-generated data processing code that is dynamically generated, the dynamically-generated data processing code supports automatically processing the data. The dynamically-generated data processing codes are generated based on the downstream processing configuration comprising instructions for mapping the data to targeted storage locations.

Generating the dynamically-generated processing code is based on passing keywords from the downstream processing configuration, where the dynamically-generated processing code comprises inferred transformations or default transformations associated with the data. In some embodiments, the dynamically-generated processing code is generated without writing the underlying code but simply passing keywords.

The multi-tier processing layer 100C further communicates data from the targeted storage locations to a plurality of data analytics services associated with a plurality of data analytics service components that are associated with the targeted storage locations. The multi-tier processing layer 100C provides monitoring operations, where the monitoring operations support centralized monitoring of data streams and data analytical tools.

With reference to FIG. 2B, FIG. 2B illustrates event processing engine 125, metadata processing engine 130, and multi-tier processing engine 140 and corresponding operations for providing a multilayer processing engine 110 in a multilayer processing system 100. At block 10, access data sources. At block 12, generate a data-driven event. At block 14, communicate the data-driven event as a data stream.

At block 16, access a data stream. At block 18, analyze the data stream. At block 20, identify metadata attributes and infer data types and column names in data of the data stream. At block 22, generate a downstream processing configuration comprising the metadata attributes and the provisioning instructions.

At block 24, communication the downstream processing configuration. At block 26, access the downstream processing configuration. At block 28, based on the downstream processing configuration, provision serverless-based resources for processing data associated with the downstream processing configuration. At block 30, based on the downstream processing configuration and serverless-based resources, store the data in target storage locations associated with the metadata attributes.

Exemplary Methods

Figure 3:
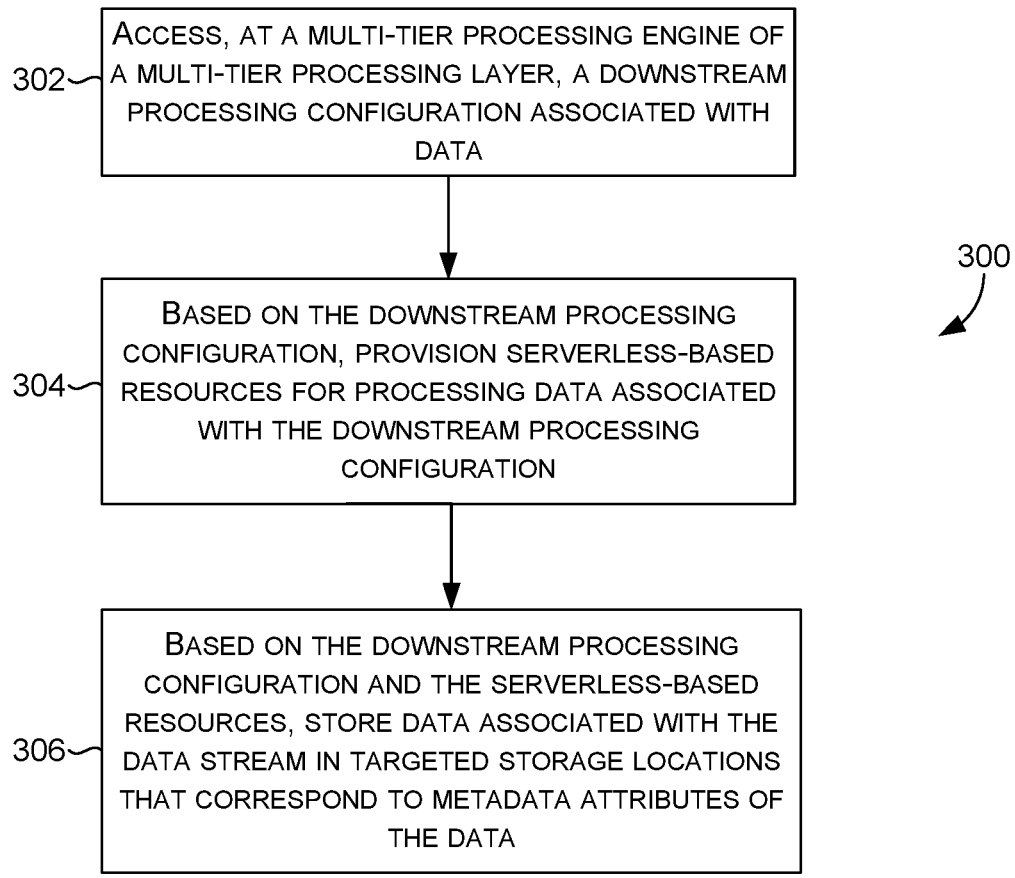
FIG. 3 is a flow diagram showing an exemplary method for implementing a data analytics system with a multilayer processing engine, in accordance with embodiments described herein.
Figure 4:
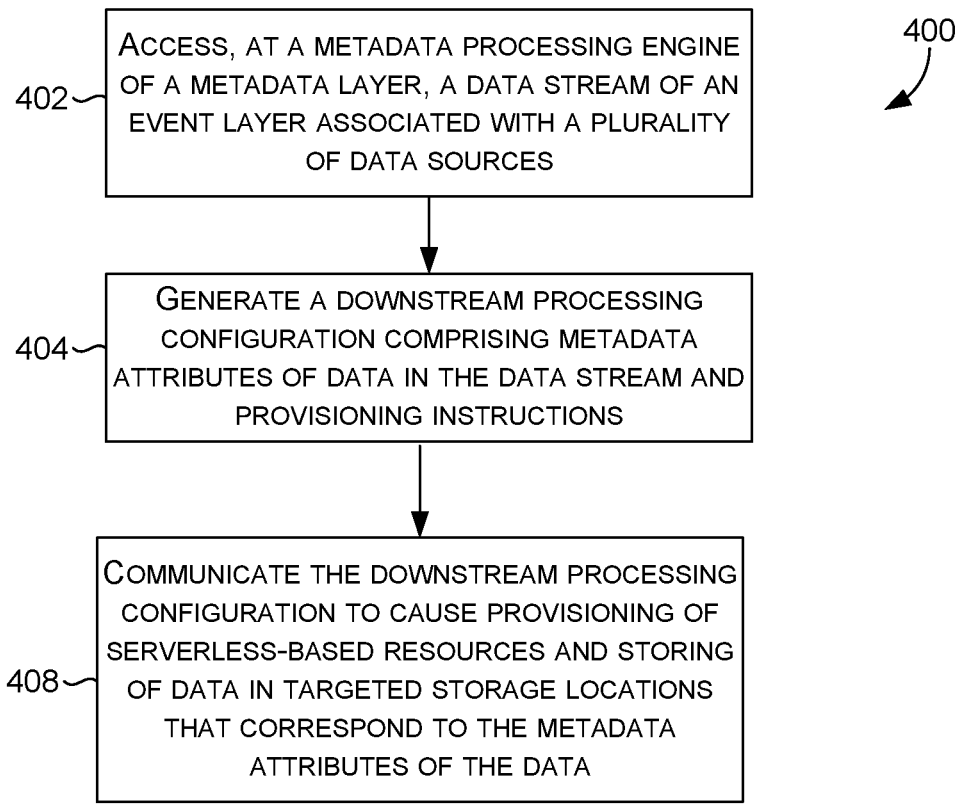
FIG. 4 is a flow diagram showing an exemplary method for implementing a data analytics system with a multilayer processing engine, in accordance with embodiments described herein.
Figure 5:
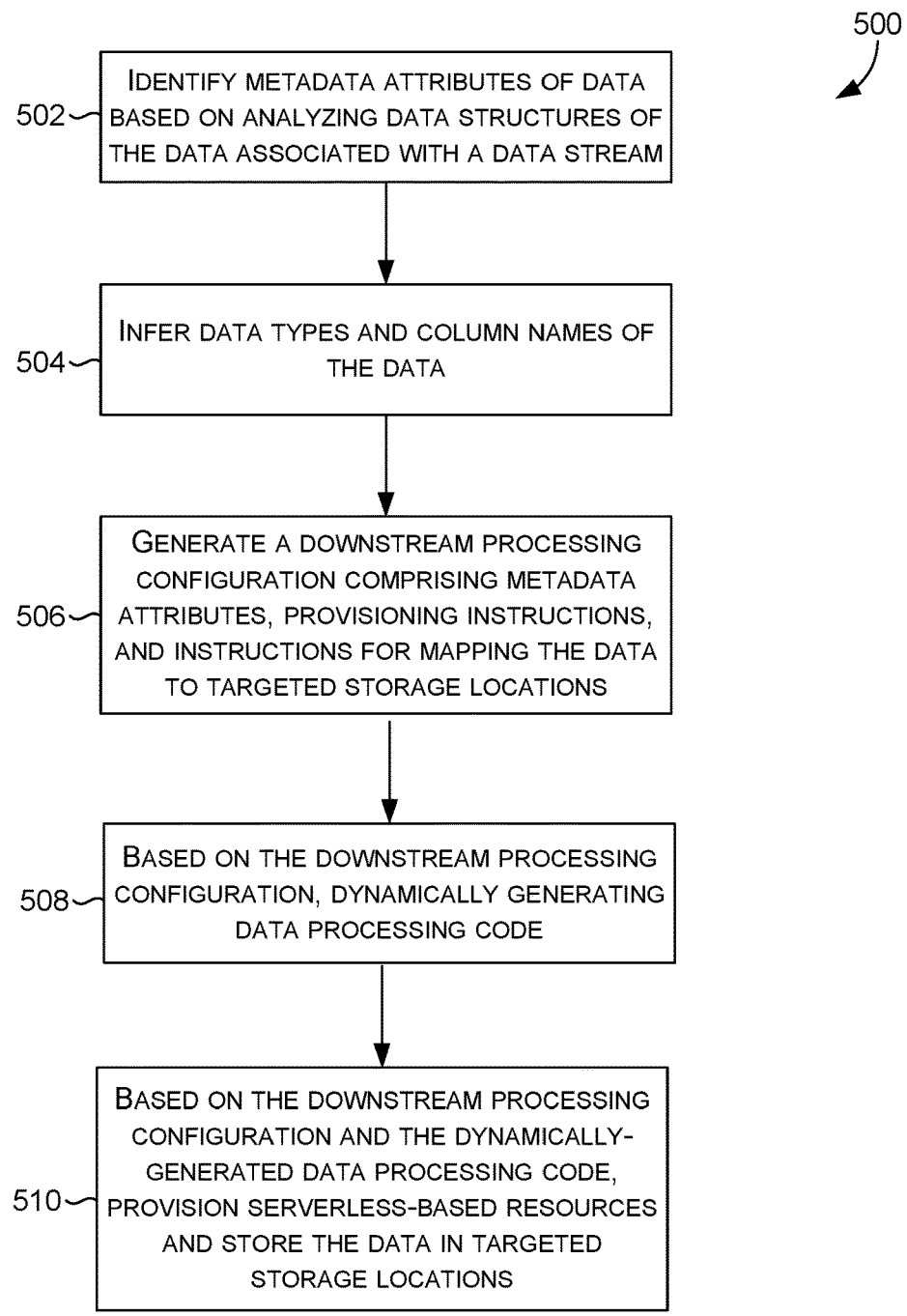
FIG. 5 is a flow diagram showing an exemplary method for implementing a data analytics system with a multilayer processing engine, in accordance with embodiments described herein.

With reference to FIGS. 3, 4 and 5, flow diagrams are provided illustrating methods for providing a multilayer processing engine in a multilayer processing system. The methods may be performed using the multilayer processing system described herein. In embodiments, one or more computer-storage media having computer-executable or computer-useable instructions embodied thereon that, when executed, by one or more processors can cause the one or more processors to perform the methods (e.g., computer-implemented method) in the multilayer processing system (e.g., a computerized system or computing system).

Turning to FIG. 3, a flow diagram is provided that illustrates a method 300 for providing a multilayer processing engine in a multilayer processing system. At block 302, access, a multi-tier processing engine of a multi-tier processing layer, a downstream processing configuration associated with data. At block 304, based on the downstream processing configuration, provision serverless-based resources for processing data associated with the downstream processing configuration. At block 306, based on the downstream processing configuration and the serverless-based resources, store data associated with the data stream in targeted storage locations that correspond to the metadata attributes of the data.

Turning to FIG. 4, a flow diagram is provided that illustrates a method 400 for providing a multilayer processing engine in a multilayer processing system. At block 402, access, at a metadata processing engine of a metadata layer, a data stream of an event layer associated with a plurality of data sources. At block 404, generate a downstream processing configuration comprising metadata attributes of data in the data stream and provisioning instructions. At block 408, communicate the downstream processing configuration to cause provisioning of serverless-based resources and storing of data in target storage locations that correspond to the metadata attributes of the data.

Turning to FIG. 5, a flow diagram is provided that illustrates a method 500 for providing a multilayer processing engine in a multilayer processing system. At block 502, identify metadata attributes of data based on analyzing data structures of the data. The data is associated with a data stream. At block 504, infer data types and column names of the data. At block 506, generate a downstream processing configuration comprising metadata attributes, provisioning instructions, and instructions for mapping the data to targeted storage locations. At block 508, based on the downstream processing configuration, dynamically generating data processing code. At block 510, based on the downstream processing configuration and the dynamically-generated data processing code, provision serverless-based resources and store the data in targeted storage locations.

Additional Support for Detailed Description of the Invention

Example Distributed Computing System Environment

Figure 6:
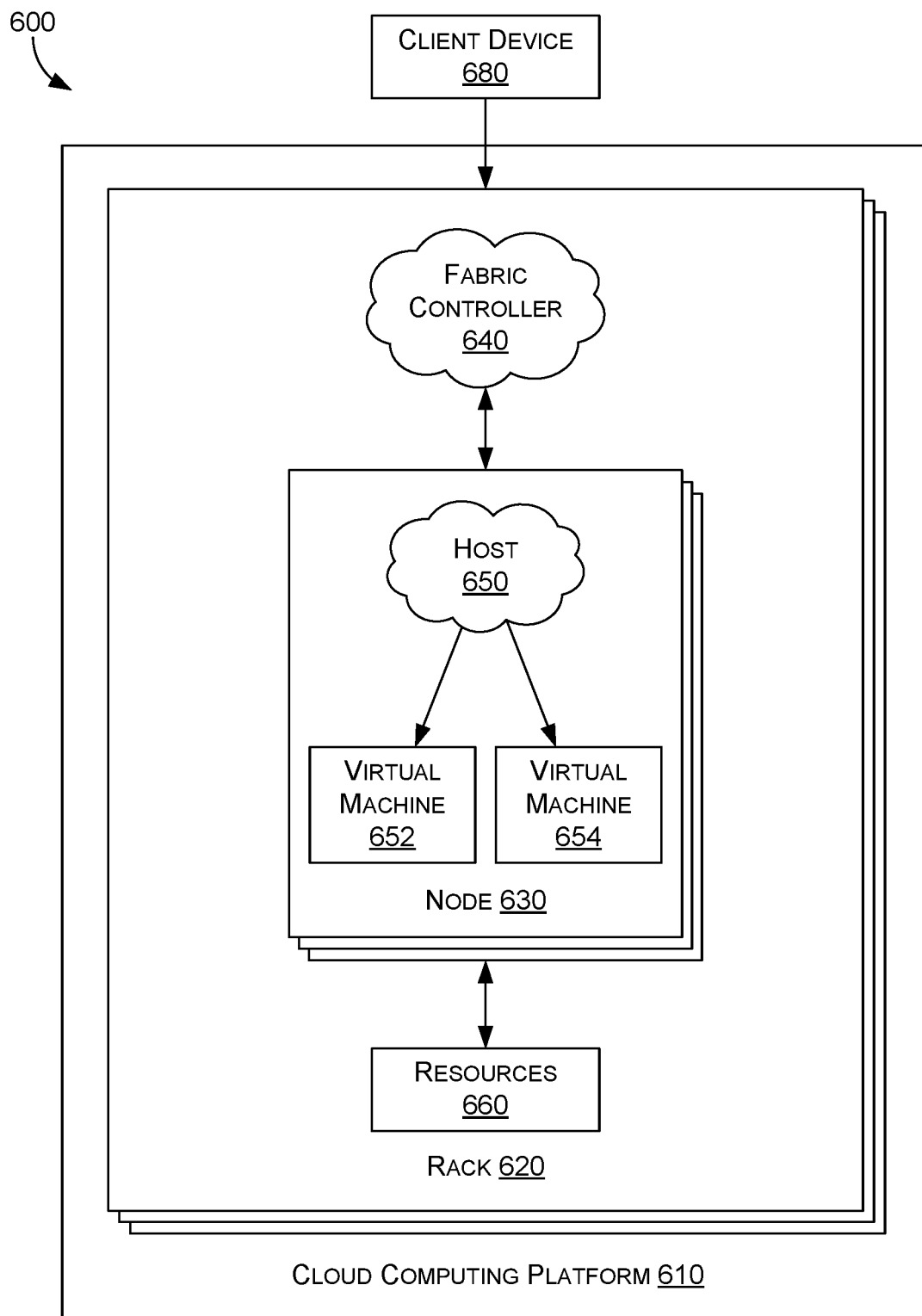
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
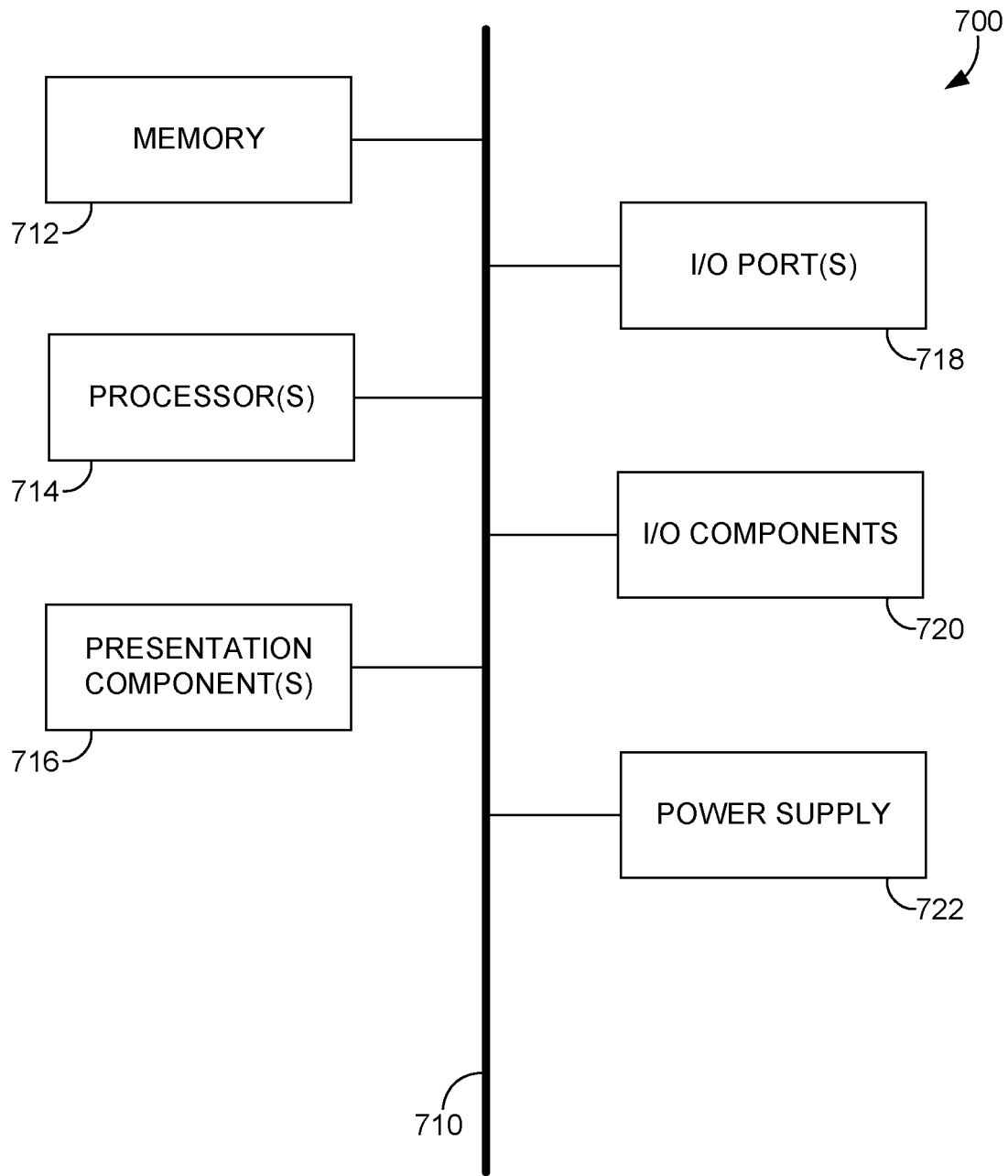
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:
1. A computerized system comprising:
one or more computer processors; and
computer memory storing computer-useable instructions that, when used by the one or more computer processors, cause the one or more computer processors to perform operations comprising:
  accessing, at a metadata processing engine of a metadata layer, a data stream of an event layer associated with a plurality of data sources,
    wherein the plurality of data sources comprise a machine learning model data source,
    wherein accessing the data stream comprises receiving an HTTP call message transmitted by the machine learning model, and
    wherein the HTTP call message comprises embedded machine learning model processing data including:
      a frequency by which the machine learning model runs,
      a time granularity of the machine learning model processing data,
      a location associated with the machine learning model processing data, and
      a name associated with the machine learning model processing data;
  generating a downstream processing configuration comprising metadata attributes of data in the data stream and provisioning instructions, wherein the metadata attributes and the provisioning instructions are generated based on the machine learning model processing data embedded in the HTTP call message;

accessing, at a multi-tier processing engine of a multi-tier processing layer, the downstream processing configuration;
based on the downstream processing configuration:
dynamically generating computer code based on the downstream processing configuration, wherein the computer code comprises instructions to transform the data stream,
provisioning serverless-based resources for processing data associated with the downstream processing configuration, wherein provisioning the serverless-based resources comprises allocating at least one of an amount of memory, an amount of computer processing unit (CPU) calls, or an amount of storage resources to a serverless distributed computing system for execution of the computer code, and
executing the computer code using the serverless distributed computing system to transform the data stream; and
based on the downstream processing configuration and the serverless-based resources, storing data associated with the transformed data stream in targeted storage locations that correspond to the metadata attributes of the data.

2. The system of claim 1, wherein the event layer, the metadata layer, and the multi-tier processing layer are in a sequential hierarchy to support analyzing data streams based on dynamic metadata-based configuration of downstream processing of the data streams.

3. The system of claim 1 wherein the metadata processing engine, the multi-tier processing engine, and a notification service are part of a multilayer processing engine that operates as a serverless data analytics management engine for scalable processing of data streams associated with targeted storage locations for data analytics tools and operations, wherein the multilayer processing engine supports dynamic scaling of the serverless-based resources.

4. The system of claim 3, wherein the multilayer processing engine provides monitoring operations, wherein the monitoring operations support centralized monitoring of data streams and data analytical tools.

5. The system of claim 1, wherein generating the downstream processing configuration comprises:
identifying metadata attributes of the data based on analyzing data structures of the data; inferring data types and column names; and
generating the downstream processing configuration comprising instructions for mapping the data to targeted storage locations based on the inferred data types, column names, and metadata attributes, wherein the targeted storage locations have corresponding metadata attributes.

6. The system of claim 1, wherein provisioning serverless-based resources comprises provisioning a target container associated with a targeted storage location; and wherein storing the data in the targeted storage locations comprises mapping the data to the targeted storage locations based on the downstream processing configuration.

7. One or more non-transitory computer-storage media having computer-executable instructions embodied thereon that, when executed by a computing system having a processor and memory, cause the processor to perform operations comprising:
accessing, at a metadata processing engine of a metadata layer, a data stream of an event layer associated with a plurality of data sources,
wherein the plurality of data sources comprise a machine learning model data source,
wherein accessing the data stream comprises receiving an HTTP call message transmitted by the machine learning model, and
wherein the HTTP call message comprises embedded machine learning model processing data including:
a frequency by which the machine learning model runs,
a time granularity of the machine learning model processing data,
a location associated with the machine learning model processing data, and
a name associated with the machine learning model processing data;
generating a downstream processing configuration comprising metadata attributes of data in the data stream and provisioning instructions, wherein the metadata attributes and the provisioning instructions are generated based on the machine learning model processing data embedded in the HTTP call message;
accessing, at a multi-tier processing engine of a multi-tier processing layer, the downstream processing configuration;
based on the downstream processing configuration:
dynamically generating computer code based on the downstream processing configuration, wherein the computer code comprises instructions to transform the data stream,
provisioning serverless-based resources for processing data associated with the downstream processing configuration, wherein provisioning the serverless-based resources comprises allocating at least one of an amount of memory, an amount of computer processing unit (CPU) calls, or an amount of storage resources to a serverless distributed computing system for execution of the computer code, and
executing the computer code using the serverless distributed computing system to transform the data stream; and
based on the downstream processing configuration and the serverless-based resources, storing data associated with the transformed data stream in targeted storage locations that correspond to the metadata attributes of the data.

8. The non-transitory computer-storage media of claim 7, wherein the event layer, the metadata layer, and the multi-tier processing layer are in a sequential hierarchy to support analyzing data streams based on dynamic metadata-based configuration of downstream processing of the data streams, wherein the event layer is associated with the plurality of data sources that are processed based on the type of data source, wherein the plurality of data sources comprise a time-based data source and the machine learning model data source.

9. The system of claim 1, wherein the event layer is associated with the plurality of data sources that are processed based on the type of data source, wherein the plurality of data sources comprise a time-based data source and the machine learning model data source.

10. The non-transitory computer-storage media of claim 7, wherein the metadata processing engine, the multi-tier processing engine, and a notification service are part of a multilayer processing engine that operates as a serverless data analytics management engine for scalable processing of data streams associated with targeted storage locations for data analytics tools and operations; and wherein the multilayer processing engine supports dynamic scaling of the serverless-based resources.

11. The non-transitory computer-storage media of claim 7, wherein generating the downstream processing configuration comprises:
identifying metadata attributes of the data based on analyzing data structures of the data; inferring data types and column names; and
generating the downstream processing configuration comprising instructions for mapping the data to targeted storage locations based on the inferred data types, column names, and metadata attributes, wherein the targeted storage locations have corresponding metadata attributes.

12. The non-transitory computer-storage media of claim 7, wherein generating the downstream processing configuration comprises identifying standards and processing steps for the data, wherein the standards and processing steps correspond to different file formats or types.

13. The system of claim 1, wherein the computer code is dynamically generated based on passing keywords from the downstream processing configuration, wherein the computer code comprises inferred transformations or default transformations associated with the data.

14. The system of claim 1, wherein the computer code is generated based on the downstream processing configuration comprising instructions for mapping the data to targeted storage locations.

15. The system of claim 1, wherein the multi-tier processing layer further communicates data from the targeted storage locations to a plurality of data analytics services associated with a plurality of data analytics service components that are associated with the targeted storage locations.

16. The system of claim 1, wherein the multi-tier processing layer provides monitoring operations, wherein the monitoring operations support centralized monitoring of data streams and data analytical tools.

\* \* \* \* \*